(12) United States Patent
Barnes et al.

(10) Patent No.: US 7,383,432 B1
(45) Date of Patent: Jun. 3, 2008

(54) SOFTWARE MODEM WITH HIDDEN AUTHENTICATION COMMANDS

(75) Inventors: Brian C. Barnes, Round Rock, TX (US); David W. Smith, Cedar Park, TX (US); Terry L. Cole, Austin, TX (US); Rodney Schmidt, Austin, TX (US); Geoffrey S. Strongin, Austin, TX (US); Michael Barclay, Swallowcliffe (GB)

(73) Assignee: Advanced Micro Devices, Inc., Austin, TX (US)

( * ) Notice: Subject to any disclaimer, the term of this patent is extended or adjusted under 35 U.S.C. 154(b) by 1306 days.

(21) Appl. No.: 09/901,531

(22) Filed: Jul. 9, 2001

(51) Int. Cl.
*H04L 9/00* (2006.01)
*G06F 7/04* (2006.01)

(52) U.S. Cl. .......................... 713/151; 713/168; 726/4
(58) Field of Classification Search ................ 713/151; 726/4
See application file for complete search history.

(56) References Cited

U.S. PATENT DOCUMENTS

| | | | | |
|---|---|---|---|---|
| 4,868,863 A | * | 9/1989 | Hartley et al. ............ | 379/93.07 |
| 5,237,567 A | * | 8/1993 | Nay et al. .................... | 370/438 |
| 5,680,458 A | * | 10/1997 | Spelman et al. ............ | 380/277 |
| 5,881,248 A | * | 3/1999 | Mergard ..................... | 710/100 |
| 6,026,293 A | | 2/2000 | Osborn ....................... | 455/411 |
| 6,115,817 A | * | 9/2000 | Whitmire .................... | 713/171 |
| 6,223,290 B1 | | 4/2001 | Larsen et al. ............... | 713/201 |
| 6,408,179 B1 | * | 6/2002 | Stosz et al. ................. | 455/428 |
| 6,594,305 B1 | * | 7/2003 | Roeck et al. ............... | 375/222 |

FOREIGN PATENT DOCUMENTS

| | | |
|---|---|---|
| EP | 0898216 A | 2/1999 |
| WO | WO 00/22865 | 4/2000 |

OTHER PUBLICATIONS

Microsoft Computer Dictionary Second Edition, p. 302, 1994.*
International Search Report dated Oct. 18, 2002 (PCT/US02/18843; TT4052-PCT).

* cited by examiner

*Primary Examiner*—Kambiz Zand
*Assistant Examiner*—Christopher J Brown
(74) *Attorney, Agent, or Firm*—Williams, Morgan & Amerson, P.C.

(57) ABSTRACT

A communications system includes a physical layer hardware unit and a processing unit. The physical layer hardware unit is adapted to communicate data over a communications channel in accordance with assigned transmission parameters. The physical layer hardware unit is adapted to receive an incoming signal over the communications channel and sample the incoming signal to generate a digital received signal. The processing unit is adapted to execute a software driver including program instructions adapted to extract control codes from the digital received signal, generate an authentication code, and transfer the control codes and the authentication code to the physical layer hardware unit. The physical layer hardware unit is adapted to signal a security violation in response to the control codes being inconsistent with the authentication code. A method for identifying security violations in a transceiver includes receiving digital data over a communications channel; extracting control codes from the digital received signal; generating an authentication code; transferring the control codes and the authentication code to a physical layer hardware unit of the transceiver; configuring assigned transmission parameters of the physical layer hardware unit based on the control codes; and signaling a security violation in response to the control codes being inconsistent with the authentication code.

21 Claims, 3 Drawing Sheets

SOFTWARE MODEM WITH HIDDEN
AUTHENTICATION COMMANDS

BACKGROUND OF THE INVENTION

1. Field of the Invention

This invention relates generally to modem communications and, more particularly, to a software modem with hidden authentication commands.

2. Description of the Related Art

In recent years, cellular telephones have become increasingly popular. A cellular telephone is one example of what is referred to as a "mobile station" or "mobile terminal." A mobile station can take on various forms other than a cellular telephone, including a computer (e.g., a notebook computer) with mobile communication capabilities.

After reconstructing the encrypted data, the modem driver 240 decrypts the encrypted data using the industry standard decryption techniques defined by the GSM standards to generate decrypted data. The modem driver 240 decodes the decrypted data and extracts control codes and/or user data. The modem driver determines an authentication code based on the control codes after they are extracted. For example, the block of decrypted data includes the control codes that need to be sent to the PHY hardware 220. The modem driver 240 extract the control codes and encode them to generate an authentication code. The specific construct of the authentication code may vary. For example, the authentication code may be a mathematical combination of the control code values or a binary manipulation of the bits making up the values (i.e., similar to a checksum). Alternatively, the modem driver 240 may encrypt the control codes based on a secret key provided by the vendor and stored in a secure location (e.g. in the system BIOS 170 or in a secure storage device on the ACR card 215). After determining and storing the authentication code, the modem driver 240 store the extracted control codes for transfer to the PHY hardware 220.

Telecommunications services are provided between a cellular telecommunications network and a mobile station over an air interface, e.g., over radio frequencies. Typically, each mobile station is assigned a unique International Mobile Subscriber Identity (IMSI). At any moment, an active mobile station may be in communication over the air interface with one or more base stations. The base stations are, in turn, managed by base station controllers, also known as radio network controllers. A base station controller and its associated base stations comprise a base station system. The base station controllers of a base station system are connected via control nodes to a core telecommunications network, such as the publicly switched telephone network (PSTN). One type of standardized mobile telecommunications scheme is the Global System for Mobile communications (GSM). GSM includes standards that specify functions and interfaces for various types of services. GSM systems may be used for transmitting both voice and data signals.

A particular base station may be shared among multiple mobile stations. Because the radio spectrum is a limited resource, the bandwidth is divided using a combination of Time-Division and Frequency-Division Multiple Access (TDMA/FDMA). FDMA involves dividing the maximum frequency bandwidth (e.g., 25 MHz) into 124 carrier frequencies spaced 200 kHz apart. A particular base station may be assigned one or more carrier frequencies. Each carrier frequency is, in turn, divided into time slots. During an active session between the base station and the mobile station, the base station assigns the mobile unit a frequency, a power level, and a time slot for upstream transmissions from the mobile station to the base station. The base station also advises the mobile station of a particular frequency and time slot for downstream transmissions that it will make to the mobile station.

The fundamental unit of time defined in GSM is referred to as a burst period, which lasts 15/26 ms (or approx. 0.577 ms). Eight burst periods are grouped into a TDMA frame (120/26 ms, or approx. 4.615 ms), which is the basic unit for the definition of logical channels. One physical channel is defined as one burst period per frame. Individual channels are defined by the number and position of their corresponding burst periods.

GSM frames, each frame having 8 burst periods, are grouped into superframes (e.g., groups of 51 frames) that include both traffic (i.e., voice or data signals) and control information. The control information is conveyed over common channels defined in the superframe structure. Common channels can be accessed both by idle mode and dedicated mode mobile stations. The common channels are used by idle mode mobile stations to exchange signaling information for changing to dedicated mode in response to incoming or outgoing calls. Mobile stations already in the dedicated mode monitor the surrounding base stations for handover and other information.

The common channels include:

- a Broadcast Control Channel (BCCH), which is used to continually broadcasts information including the base station identity, frequency allocations, and frequency-hopping sequences;
- a Frequency Correction Channel (FCCH) and Synchronization Channel (SCH), which are used to synchronize the mobile station to the time slot structure of a cell by defining the boundaries of burst periods, and the time slot numbering (i.e., every cell in a GSM network broadcasts exactly one FCCH and one SCH, which are, by definition, sent on time slot number 0 within a TDMA frame);
- a Random Access Channel (RACH), which is used by the mobile station to request access to the network;
- a Paging Channel (PCH), which is used to alert the mobile station of an incoming call; and
- an Access Grant Channel (AGCH), which is used to allocate a Stand-alone Dedicated Control Channel (SDCCH) to a mobile station for signaling (i.e., to obtain a dedicated channel) following a request on the RACH.

For security reasons, GSM data is transmitted in an encrypted form. Because a wireless medium can be accessed by anyone, authentication is a significant element of a mobile network. Authentication involves both the mobile station and the base station. A Subscriber Identification Module (SIM) card is installed in each mobile station. Each subscriber is assigned a secret key. One copy of the secret key is stored in the SIM card, and another copy is stored in a protected database on the communications network that may be accessed by the base station. During an authentication event, the base station generates a random number that it sends to the mobile station. The mobile station uses the random number, in conjunction with the secret key and a ciphering algorithm (e.g., A3), to generate a signed response that is sent back to the base station. If the signed response sent by the mobile station matches the one calculated by the base station, the subscriber is authenticated. The base station encrypts data transmitted to the mobile station using the secret key. Similarly, the mobile station encrypts data it transmits to the base station using the secret key. After a transmission received by the mobile station is decrypted, various control information, including the assigned power level, frequency, and time slot for a particular mobile station may be determined by the mobile station.

Generally, communication systems are described in terms of layers. The first layer, responsible for the actual transmission of a data carrying signal across the transmission medium, is referred to as the physical layer (PHY). The physical layer groups digital data and generates a modulated waveform based on the data in accordance with the particular transmission scheme. In GSM, the physical layer generates the transmission waveform and transmits during the assigned transmit time slot of the mobile station. Similarly, the receiving portion of the physical layer identifies data destined for the mobile station during the assigned receipt time slot.

The second layer, referred to as a protocol layer, processes digital data received by the physical layer to identify information contained therein. For example, in a GSM system, decryption of the data is a protocol layer function. Notice that changes in the operating parameters of the physical layer are identified only after decryption and processing by the protocol layer. Although this particular interdependency does not generally cause a problem in a purely hardware implementation, it may cause a problem when all or portions of the protocol layer are implemented in software.

Certain computer systems, especially portable notebook computers, may be equipped with wireless modems. One trend in modem technology involves the use of software modems that implement some of the real-time functions of traditional hardware modems using software routines. Because the hardware complexity of a software modem is less than a hardware counterpart, it is generally less expensive as well as more flexible. For example, the protocol layer decryption and processing may be implemented partially or entirely with software.

Software systems, such as PC systems, run interface control software in operating systems environments as software drivers. These drivers are responsible for communicating to the hardware devices and operate at a privileged level in the operating system. Other software applications are precluded from affecting the drivers. However, because drivers are not protected from other drivers, a variety of problems can occur that might affect the operation of a driver, such as by corrupting its operation. These effects may be caused accidentally, or may be caused by purposeful hacking. A corrupted (or co-opted) driver might cause additional problems outside the computer, such as causing a phone line or wireless channel to be used, operating an external peripheral, or deleting important data.

Because the operating parameters of the physical layer, which control the operation of the transmitter of the mobile station, are controlled by the protocol layer using software, it may be possible for a computer program or virus to take control of the mobile station and cause it to accidentally or purposefully transmit outside of its assigned time slot. A wireless communications network, such as a cellular network, relies on a shared infrastructure. A mobile station must adhere to the 'rules of the road' or it may cause interference on the network.

If certain functions of the mobile station are controlled in software, a programmer may determine how the GSM control frames are decoded and how the transmitter module is triggered. A virus may then be written and spread over the network to infiltrate the software-based mobile stations. Then, on a particular time and date, the virus could take direct control of the mobile station and transmit continuously or intermittently and inundate the base stations and other mobile units with random frequencies and full power. Such a virus design could enable and disable at random times to avoid detection, robbing the air-time supplier of some or all of his available bandwidth and may even cause a complete shutdown of the network. Such an attack may take only a few affected devices (i.e., as few as one) per cell to disable the cell completely.

The security problems associated with mobile stations operating in a shared infrastructure may be segregated into three levels of severity: tamper-proof, non-tamperproof, and class break. First, a hardware/firmware implementation (such as a cell-phone) is the hardest with which to tamper, because each device must be physically acquired individually and modified (i.e., tamper-proof). On the other hand, a software-based solution is easier to tamper with, as a hacker can concentrate on a software-only debugger environment (i.e., non-tamper-proof). Finally, a system with the ability to be tampered with that is similar on all systems and allows the tampering to be distributed to a large number of systems of the same type is susceptible to a 'class-break.'

A software wireless modem is susceptible not only to a class-break, but also it is among those devices whose code may be accessed from the same layer as IP (internet protocol) or another portable code access mechanism. Many software wireless modems may be integrated into computers coupled to networks or the Internet. Such an arrangement increases the susceptibility of the software to being tampered with and controlled.

Communication devices implementing other communications protocols using software may also be susceptible to some of the problems identified above, but to differing degrees and levels of consequence. For example, software drivers for communication devices using copper subscriber lines, such voice band modems (V.90), asymmetric digital subscriber line (DSL) modems, home phone line networks (HomePNA), etc., may be attacked, resulting in the subscriber line being disabled or improperly used. For example, a group of infected software modems may be used in a denial of service attack to continuously place calls to a predetermined number and overwhelm the destination. The software modem could also be used to prevent outgoing or incoming calls on the subscriber line or disrupt HomePNA traffic. Other wireless communication devices implemented in software, such as wireless network devices, could also be commandeered to disrupt traffic on the wireless network.

The present invention is directed to overcoming, or at least reducing the effects of, one or more of the problems set forth above.

SUMMARY OF THE INVENTION

One aspect of the present invention is seen in a communications system including a physical layer hardware unit and a processing unit. The physical layer hardware unit is adapted to communicate data over a communications channel in accordance with assigned transmission parameters. The physical layer hardware unit is adapted to receive an incoming signal over the communications channel and sample the incoming signal to generate a digital received signal. The processing unit is adapted to execute a software driver including program instructions adapted to extract control codes from the digital received signal, generate an authentication code, and transfer the control codes and the authentication code to the physical layer hardware unit. The physical layer hardware unit is adapted to signal a security violation in response to the control codes being inconsistent with the authentication code.

Another aspect of the present invention is seen in a method for identifying security violations in a transceiver. The method includes receiving digital data over a communications channel; extracting control codes from the digital received signal; generating an authentication code; transferring the control codes and the authentication code to a physical layer hardware unit of the transceiver; configuring assigned transmission parameters of the physical layer hardware unit based on the control codes; and signaling a security violation in response to the control codes being inconsistent with the authentication code.

BRIEF DESCRIPTION OF THE DRAWINGS

The invention may be understood by reference to the following description taken in conjunction with the accompanying drawings, in which like reference numerals identify like elements, and in which.

Figure 1:
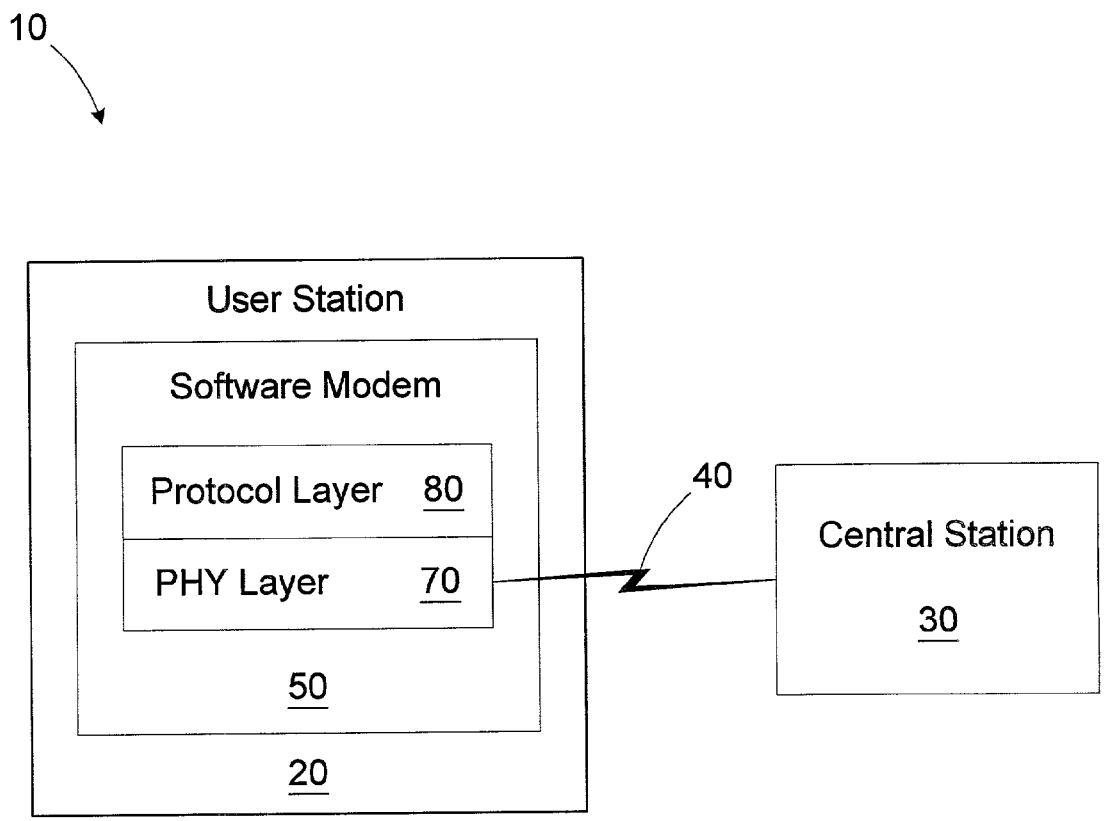
FIG. 1 is a simplified block diagram of a communications system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a communications system 10 is provided. The communications system 10 includes a user station 20 in communication with a central station 30 over a communication channel 40. In the illustrated embodiment, the user station 20 is a mobile computing device using a software modem 50 to communicate in accordance with a wireless communication protocol, such as GSM. The central station 30 may be a shared base station capable of serving a plurality of subscribers. Although the invention is described as it may be implemented in a wireless environment, its application is not so limited. The teachings herein may be applied to other communication environments using software implemented communication protocols (e.g., V.90, ADSL, HomePNA, Wireless LAN, etc.).

The user station 20 may comprise a variety of computing devices, such as a desktop computer, a notebook computer, a personal data assistant (PDA), etc. For purposes of illustration, the user station 20 is described as it may be implemented using a notebook computer. The software modem 50 may be installed as an internal resource. As will be appreciated by those of ordinary skill in the art, the software modem 50 includes a physical layer (PHY) 70 implemented in hardware and a protocol layer 80 implemented in software. For purposes of illustration, the functions of the software modem 50 are described as they might be implemented for a GSM communication protocol, although other protocols may be used.

The PHY layer 70 converts digital transmit signals into an analog transmit waveform and converts an incoming analog received waveform into digital received signals. For transmit signals, the output signal of the protocol layer 80 is the transmit "on-air" information modulated about a zero Hz carrier (i.e., a carrierless signal). The PHY layer 70 mixes (i.e., mixing may also be referred to as upconverting) the carrierless transmit signal generated by the protocol layer 80 in accordance with assigned time slot, frequency, and power level assignments communicated to the user station 20 by the central station 30 to generate the actual analog waveform transmitted by the PHY layer 70.

The central station 30 also communicates time slot and frequency assignments to the user station 20 for incoming data. The incoming analog receive waveform is sampled and downconverted based on the assigned time slot and frequency parameters to recreate a carrierless (i.e., modulated about zero Hz) receive waveform. The protocol layer 80 receives the carrierless receive waveform from the PHY layer 70 and performs baseband processing, decryption, and decoding to regenerate the received data.

Collectively, the time slot, frequency, and power level (i.e., for transmit data only) assignments are referred to as control codes. The particular algorithms used for implementing the software modem 50 are described by the particular industry standards (e.g., GSM standards) and are well known to those of ordinary skill in the art, so for clarity and ease of illustration they are not detailed herein, except as they are modified in accordance with the present invention.

In the communications system 10 of the instant invention, the central station 30 transmits data in accordance with traditional GSM techniques. The data received by the protocol layer 80 is encrypted. The functions of the protocol layer 80 include decoding and decrypting the received data, extracting the control codes and user data, and sending the control codes to the PHY layer 70. The commands sent to the PHY layer 70 by the protocol layer 80 include a hidden authentication command, as will be described in greater detail below. If the authentication command is missing or does not coincide with what is expected by the PHY layer 70, the PHY layer 70 inhibits further operation of the modem 50.

Figure 2:
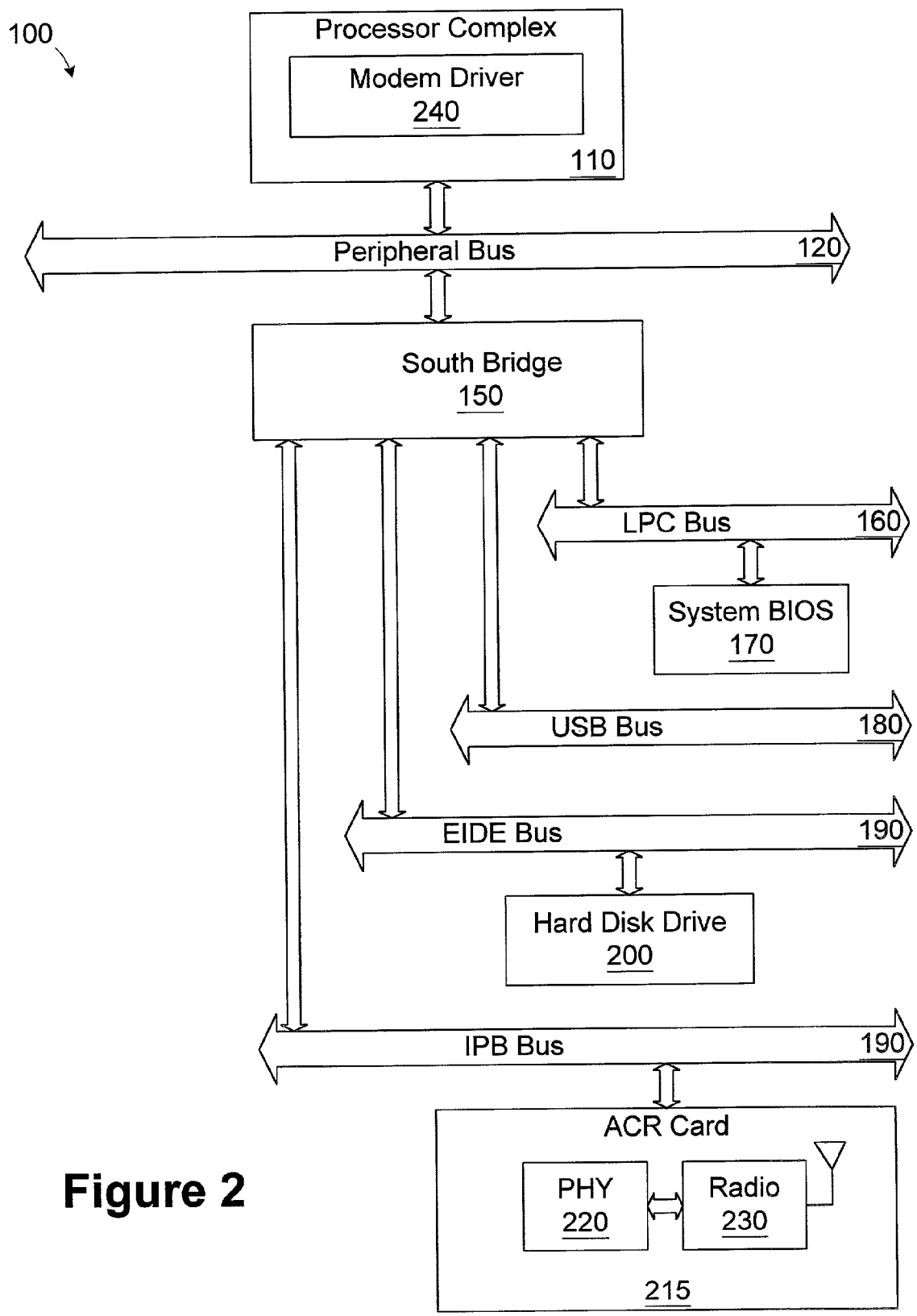
FIG. 2 is a simplified block diagram of an exemplary computer that embodies a user station in the communications system of FIG. 1.

Turning now to FIG. 2, a block diagram of the user station 20 embodied in a computer 100 is provided. The computer 100 includes a processor complex 110. For clarity and ease of understanding not all of the elements making up the processor complex 110 are described in detail. Such details are well known to those of ordinary skill in the art, and may vary based on the particular computer vendor and microprocessor type. Typically, the processor complex 110 includes a microprocessor, cache memories, system memory, a system bus, a graphics controller, and other devices, depending on the specific implementation.

The processor complex 110 is coupled to a peripheral bus 120, such as a peripheral component interface (PCI) bus. Typically a bridge unit (i.e., north bridge) in the processor complex 110 couples the system bus to the peripheral bus 120. A south bridge 150 is coupled to the peripheral bus 120. The south bridge 150 interfaces with a low pin count (LPC) bus 160 that hosts a system basic input output system (BIOS) memory 170, a universal serial bus (USB) 180 adapted to interface with a variety of peripherals (e.g., keyboard, mouse, printer, scanner, scanner) (not shown), an enhanced integrated drive electronics (EIDE) bus 190 for interfacing with a hard disk drive 200 and a CD-ROM drive (not shown), and an integrated packet bus (IPB) 210.

The IPB bus 210 hosts the hardware portion of the software modem 50. In the illustrated embodiment, the software modem 50 is hosted on an advanced communications riser (ACR) card 215. Specifications for the ACR card 215 and the IPB bus 210 are available from the ACR Special Interest Group (ACRSIG.ORG). The software modem 50 includes a PHY hardware unit 220 and a radio 230. In the illustrated embodiment, the radio 230 is adapted to transmit and receive GSM signals. Collectively, the PHY hardware unit 220 and the radio 230 form the PHY layer 70 (see FIG. 1). The processor complex 110 executes program instructions encoded in a modem driver 240. Collectively, the processor complex 110 and the modem driver 240 implement the functions of the protocol layer 80 (see FIG. 1).

For incoming data received by the software modem 50, the modem driver 240 demodulates the carrier-less waveform to reconstruct encrypted data received by the PHY hardware 220. The process for reconstructing the encrypted data is well known to those of ordinary skill in the art, and is defined in industry GSM standards. For clarity and ease of illustration, the details of the reconstruction process are not included herein.

After reconstructing the encrypted data, the modem driver 240 decrypts the encrypted data using the industry standard decryption techniques defined by the GSM standards to generate decrypted data. The modem driver 240 decodes the decrypted data and extracts control codes and/or user data. The modem driver determines an authentication code based on the control codes after they are extracted. For example, the block of decrypted data includes the control codes that need to be sent to the PHY hardware 220. The modem driver 240 extract the control codes and encode them to generate an authentication code. The specific construct of the authentication code may vary. For example, the authentication code may be a mathematical combination of the control code values or a binary manipulation of the bits making up the values (i.e., similar to a checksum). Alternatively, the modem driver 240 may encrypt the control codes based on a secret key provided by the vendor and stored in a secure location (e.g., in the system BIOS 170 or in a secure storage device on the ACR card 215. After determining and storing the authentication code, the modem driver 240 store the extracted control codes for transfer to the PHY hardware 220.

The modem driver 240 passes the control codes to the PHY hardware 220. Coincident with the command that includes the control codes, the modem driver also sends the authentication code in such a way that is hidden or hard to detect for a hacker trying to co-opt the modem driver 240. Because the authentication code is hidden, the hacker may try to modify the control codes without realizing that the authentication code exists. The PHY hardware 220 is adapted to recognize the inconsistency between the altered control codes and the authentication code and prevent the radio 230 from being operated. If no inconsistency between the control codes and the authentication code exists, the PHY hardware 220 accepts the control codes and configures the radio 230 based on the assigned time slot, frequency, and power level information contained in the control codes.

An exemplary technique for hiding the authentication code from normal detection is now described in greater detail. Typical commands sent by the processor complex 110 to a peripheral device, such as the ACR card 215 are limited to 32 bits in width. However, the data bus of the processor complex 110 is 64 bits wide. The authentication code may be embedded in the normally unused bits on the data bus. A hacker trying to intercept the control codes would normally monitor only the 32 bits of the bus that are expected to contain the command issued to the PHY hardware 220 that contains the control codes. When the command including the control codes and the "hidden" authentication code are received by the south bridge 150, the south bridge is configured to transfer the data while maintaining the hidden nature of the authentication code.

In the illustrated embodiment, the south bridge 150 communicates with the ACR card 215 using an IPB protocol. The IPB bus 190 uses dual two-bit data busses for input and output to allow for full duplex data communications with the target device (i.e., ACR card 215). The IPB bus 190 uses a time division multiplexing design. It includes 32-bit slots (16 clock cycles in a 2 bit wide bus) that are combined to create a frame. Frame length is programmable from 2 through 16 slots. The frame length is set once during any main IPB system configuration cycle (power-on, reset etc.). It is not dynamic, and may not be changed on the fly. If a different frame length is desired, a full configuration cycle must be executed. If during communication between over the IPB bus 190, more that the programmed number of slots than are transferred, the additional slots are considered to carry invalid data and are ignored. The south bridge 150 may take advantage of these normally ignored frames by intentionally sending more frames than were programmed and embedding the authentication code in the extra frames. Rather than ignoring the extra frames, the PHY hardware 220 on the ACR card 215 may extract the authentication code from the extra frames to determine if the control codes have been altered.

Sending the authentication code in a portion of the data communication framework that is normally unused or ignored is generically referred to herein as sending the authentication code "out-of-band." There are many possibilities for sending out-of-band signals, depending on the specific implementation of the computer system 100 and the particular protocols used for data exchange between devices in the system.

Figure 3:
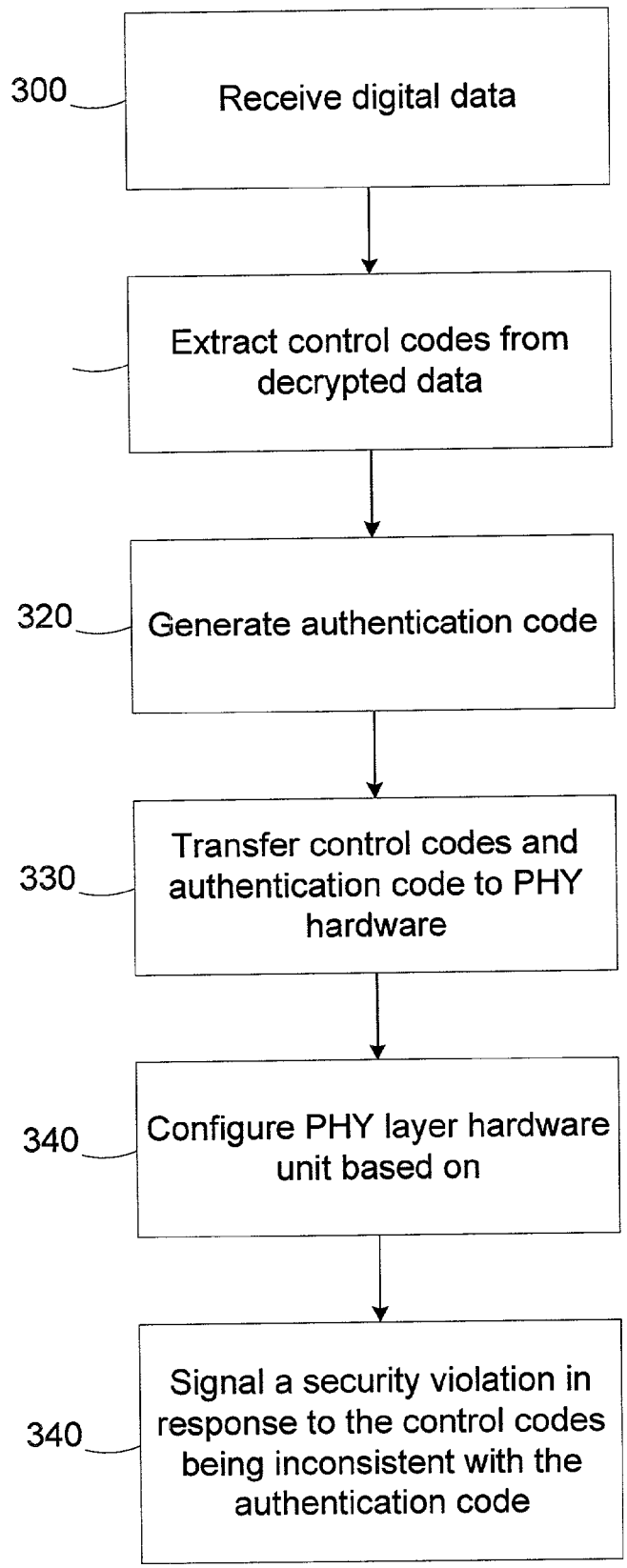
FIG. 3 is a simplified flow diagram of a method for identifying security violations in a transceiver in accordance with another illustrative embodiment of the present invention.

Turning now to FIG. 3, a simplified flow diagram of a method for identifying security violations in a transceiver in accordance with another illustrative embodiment of the present invention is provided. In block 300, digital data is received over a communications channel. In block 310, control codes are extracted from the digital data. In block 320, an authentication code is generated. The authentication code may be generated based on the control codes. In block 330, the control codes and the authentication code are transferred to a physical layer hardware 220 unit of the transceiver. The authentication code may be hidden. One technique for hiding the authentication code includes transferring the authentication code out-of-band with respect to the control codes. For example, the authentication may be transferred over an unused portion of a data bus or by sending extra information in a manner that is conventionally ignored. In block 340, the physical layer hardware unit 220 is configured based on the control codes. In block 250, a security violation is signaled in response to the control codes being inconsistent with the authentication code.

By using the authentication code to oversee the configuration of the PHY hardware 220 based on the control codes, attempts at surreptitious control of the software modem 50 may be identified and stopped relatively quickly. As such, the potential for wide scale disruption of the communications network is reduced. The security of the software modem 50 is increased without sacrificing the flexibility and adaptability features inherent in its software implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A communications system, comprising:
   a physical layer hardware unit adapted to communicate data over a communications channel in accordance with assigned transmission parameters, the physical layer hardware unit being adapted to receive an incoming signal over the communication channel and sample the incoming signal to generate a digital received signal; and
   a processing unit adapted to execute a software driver including program instructions adapted to extract control codes from the digital received signal, generate an authentication code based on at least one extracted control code, and transfer the control codes and the authentication code to the physical layer hardware unit, wherein the physical layer hardware unit is adapted to signal a security violation in response to the control codes being inconsistent with the authentication code.

2. The system of claim 1, wherein the authentication code comprises a hidden authentication code.

3. The system of claim 1, wherein the software driver includes program instructions adapted to transfer the authentication code out-of-band with respect to the control codes.

4. The system of claim 3, wherein the processor complex includes a data bus, and the software driver includes program instructions adapted to transfer the authentication code on an unused portion of the data bus.

5. The system of claim 3, wherein the processing unit includes a data bus adapted to transfer data in frames having a fixed number of slots, and the software driver includes program instructions adapted to transfer the authentication code using a frame having more slots than the fixed number of slots.

6. The system of claim 1, wherein the software driver includes program instructions adapted to extract encrypted data from the digital received signal and decrypt the encrypted data to generate decrypted data including the control codes.

7. The system of claim 6, wherein the software driver includes program instructions adapted to generate the authentication code based on the decrypted data.

8. The system of claim 1, wherein the assigned transmission parameters include at least one of a power level assignment, a frequency assignment, and a time slot assignment.

9. The system of claim 1, wherein the processing unit comprises a computer.

10. The system of claim 9, wherein the computer includes:
    a processor complex adapted to execute the program instructions in the software driver;
    a bus coupled to the processor complex; and
    an expansion card coupled to the bus, the expansion card including the physical layer hardware.

11. The system of claim 1, wherein the physical layer hardware unit is adapted to prohibit at least some communication over the communications channel in response to identifying the security violation.

12. A method for identifying security violations in a transceiver, comprising:
    receiving digital data over a communications channel;
    extracting control codes from the digital received signal;
    generating an authentication code based on at least one extracted control code;
    transferring the control codes and the authentication code to a physical layer hardware unit of the transceiver;
    configuring assigned transmission parameters of the physical layer hardware unit based on the control codes; and
    signaling a security violation in response to the control codes being inconsistent with the authentication code.

13. The method of claim 12, wherein generating the authentication code further comprises generating a hidden authentication code.

14. The method of claim 12, wherein transferring the control codes and the authentication code comprises transferring the authentication code out-of-band with respect to the control codes.

15. The method of claim 14, wherein transferring the control codes and the authentication code comprises transferring the authentication code on an unused portion of a data bus communicating with the transceiver.

16. The method of claim 14, wherein the transceiver is coupled to data bus adapted to transfer data in frames having a fixed number of slots, and transferring the control codes and the authentication code comprises transferring the authentication code using a frame having more slots than the fixed number of slots.

17. The method of claim 12, further comprising:
    extracting encrypted data from the digital received signal; and
    decrypting the encrypted data to generate decrypted data including the control codes.

18. The method of claim 17, wherein generating the authentication code comprises generating the authentication code based on the decrypted data.

19. The method of claim 12, wherein configuring assigned transmission parameters of the physical layer hardware unit based on the control codes comprises configuring at least one of a power level parameter, a frequency parameter, and a time slot parameter.

20. The method of claim 12, further comprising prohibiting communication over the communications channel in response to identifying the security violation.

21. A modem, comprising:
- means for receiving digital data over a communications channel;
- means for extracting control codes from the digital received signal;
- means for generating an authentication code based on at least one extracted control code;
- means for transferring the control codes and the authentication code to a physical layer hardware unit of the modem;
- means for means for configuring assigned transmission parameters of the physical layer hardware unit based on the control codes; and
- means for signaling a security violation in response to the control codes being inconsistent with the authentication code.

* * * * *